United States Patent
Erb et al.

(10) Patent No.: US 12,330,353 B2
(45) Date of Patent: Jun. 17, 2025

(54) METHOD FOR PRODUCING A FIBROUS COMPOSITE MATERIAL COMPONENT

(71) Applicant: Dr. Ing. h.c. F. Porsche Aktiengesellschaft, Stuttgart (DE)

(72) Inventors: Thiemo Erb, Stuttgart (DE); Benjamin Müller, Heimsheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 95 days.

(21) Appl. No.: 18/139,403

(22) Filed: Apr. 26, 2023

(65) Prior Publication Data

US 2023/0415389 A1    Dec. 28, 2023

(30) Foreign Application Priority Data

Jun. 27, 2022   (DE) ............ 10 2022 115 944.2

(51) Int. Cl.
| | |
|---|---|
| B29C 45/14 | (2006.01) |
| B29C 45/00 | (2006.01) |
| B29C 45/02 | (2006.01) |
| B29K 101/12 | (2006.01) |
| B29K 105/00 | (2006.01) |
| B29K 105/08 | (2006.01) |
| B29K 307/04 | (2006.01) |

(52) U.S. Cl.
CPC ...... B29C 45/1418 (2013.01); B29C 45/0001 (2013.01); B29C 45/02 (2013.01); B29C 45/14811 (2013.01); B29C 2045/14188 (2013.01); B29C 2045/14245 (2013.01); B29K 2101/12 (2013.01); B29K 2105/0845 (2013.01); B29K 2105/251 (2013.01); B29K 2105/253 (2013.01); B29K 2307/04 (2013.01); B29K 2313/00 (2013.01)

(58) Field of Classification Search
CPC .......... B29C 70/12; B29C 70/68; B29C 70/30
See application file for complete search history.

(56) References Cited

U.S. PATENT DOCUMENTS

2013/0231017 A1    9/2013   Schmidt et al.

FOREIGN PATENT DOCUMENTS

| CA | 2584581 | * | 11/2011 |
| DE | 102010041243 A1 | | 3/2012 |
| DE | 102012007839 A1 | | 12/2012 |

* cited by examiner

*Primary Examiner* — Edmund H Lee
(74) *Attorney, Agent, or Firm* — Buchanan Ingersoll & Rooney PC

(57) ABSTRACT

A method for producing a fibrous composite material component, in particular for a vehicle. According to the method, at least one dry woven fabric layer is initially provided, wherein the woven fabric layer includes carbon fibers. A binder is then applied to the woven fabric layer. Further, the woven fabric layer is reshaped into a preform layer, wherein the binder is activated during the reshaping and the woven fabric is stabilized in the reshaped shape. The preform layer is then applied to further woven fabric layers in order to strengthen the shape. The connection of the preform layer and the further woven fabric layers thus results in a preform, which is inserted into a molding tool for carrying out an RTM process. Then, the RTM process is carried out in order to obtain a fibrous composite material component.

15 Claims, 1 Drawing Sheet

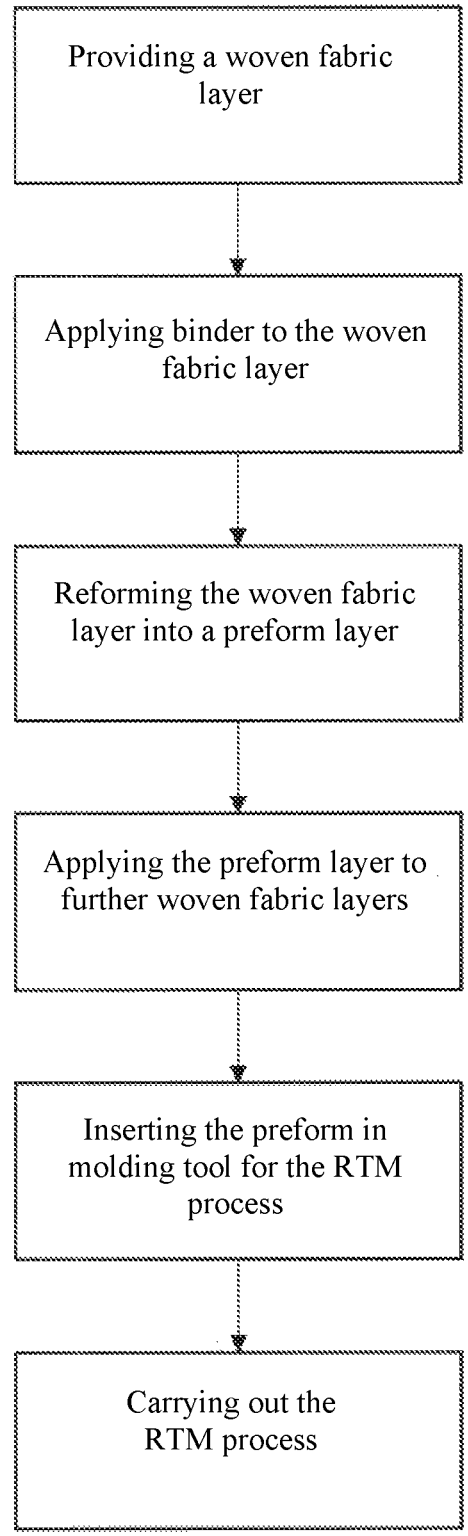

METHOD FOR PRODUCING A FIBROUS COMPOSITE MATERIAL COMPONENT

CROSS-REFERENCE TO RELATED APPLICATION

This application claims priority to German Patent Application No. 10 2022 115 944.2, filed Jun. 27, 2022, the content of such application being incorporated by reference herein in its entirety.

FIELD OF THE INVENTION

The invention relates to a method for producing a fibrous composite material component, in particular a visible carbon component, wherein the fibrous composite material component is provided in particular for a vehicle.

BACKGROUND OF THE INVENTION

Fibrous composite materials generally consist of two main components, namely a cushioning matrix, e.g. resin, and a reinforcing woven fabric consisting of fiber. Fiberglass or carbon fibers are often used. Components made of carbon fibrous composite materials are often used in vehicle construction, especially in sports vehicles, because they have a low weight and at the same time a high mechanical strength.

Components made of carbon fibrous composite material in which the carbon woven fabric is visible through the use of a translucent matrix are also referred to as visible carbon components. They are especially popular for their exclusive and athletic look.

Like other components made from a fibrous composite, visible carbon components are produced in accordance with the prior art by so-called RTM processes ("resin-transfer-molding processes"). In the RTM process, dry woven fabric layers are inserted into a usually two-piece molding tool. Thereafter, the molding tool is closed and constantly injected with reaction resin (resin-hardener mixture) via a sprue at a particular injection pressure. The fibrous layers are thus saturated with the resin. Excess resin leaks out at risers/vents. To prevent air pockets, additional resin can be subsequently pressed. The curing of the component is usually carried out under pressure and with closed venting risers. When the component is fully cured, it is removed from the tool.

For carrying out the RTM process, it is therefore important that the woven fabric layers are as dry as possible or porous as possible so that the woven fabric can well connect to the injected resin. However, if only several woven fabric layers are inserted into the molding tool of the RTM process, they will not experience any pre-fixation, which can lead to a so-called blurring of the fibrous layers. The woven fabric folds in some places, resulting in an uneven composite and, most importantly, an optically unappealing result.

There is thus the need to already connect the woven fabric layers to a so-called preform, which has a certain degree of stability and is machinable and manageable, while the injection of the resin does not become blurred and is still porous enough for the resin to penetrate the woven fabric layer, and a good blister-free tearing of the woven fabric occurs. The term preform is thus to be understood as a fibrous, semi-finished product, which consists of at least one woven fabric layer and is inserted into the molding tool of the RTM process.

According to the prior art, a so-called prepreg layer is used in order to produce the preform, as disclosed in DE 102010041243 A1, which is incorporated by reference herein, for example. The document describes prepregs based on storage-stable polyurethane composition for the production of composite material components with visible carbon fibrous fabrics or laid structures. Prepreg layers are already saturated, i.e. woven fabric layers coated or soaked with resin or other matrix agents, which are form-flexible until the resin hardens. Thus, preforms can first be produced from the prepreg layers, which are subsequently made into a finished visible carbon component by RTM processes. In the production of the preforms, essentially two alternatives are known.

According to the first alternative, prepreg layers are first coated with dry woven fabric layers and then molded in a tool and cured. The resin of the prepreg layer is thereby partially drawn into the non-saturated woven fabric layers, thereby creating an overall porous woven fabric, which can then be used as a preform in the RTM process. It is disadvantageous, however, that pre-saturation by the use of prepreg layers cannot be avoided and the preform is comparatively heavy and has a high thickness due to the necessary use of multiple layers.

According to the second alternative, the prepreg layer is covered with a perforated film and subsequently with a non-woven fabric. Then, the packet is subjected to sufficient temperature in order to melt the saturation of the prepreg layer, and thus the resin is drawn out of the prepreg layer. This results in a porous, cured, visible carbon layer that can be applied to a further layer construction consisting of a plurality of woven fabric layers. The disadvantage of this method, however, is that manufacturing is expensive due to the expensive production and use of the nonwoven fabric and the perforated film. In addition, to produce the preform, both the nonwoven fabric and the resin removed from the prepreg layer must be disposed of, which must be considered disadvantageous with regard to the sustainability of the process.

DE102012007839A1, which is incorporated by reference herein, describes a further possibility for producing a preform. It describes a multi-layer composite material component for a visible woven fabric and a method for producing it, wherein the visible woven fabric is fixed in a predefined position with a pre-saturated fibrous layer and a glass pane. The glass pane forms the delineation of the visible woven fabric from the surrounding environment.

SUMMARY OF THE INVENTION

Against the described background, described herein is a method for producing a fibrous composite material component that overcomes the disadvantages of the prior art described above and still delivers a high-quality result. This problem is solved by the subject-matter of the present main claim. Advantageous further developments of the invention are contained in the subclaims.

According to the method according to aspects of the invention, at least one dry woven fabric layer is initially provided, wherein the woven fabric layer consists in particular of carbon fibers. A woven fabric layer without prior saturation is to be understood as a dry woven fabric layer. It thus consists of only the interwoven fibers. A binder is then applied to the woven fabric layer. A binder is referred to herein as a means which, when activated, solidifies and connects with the fibers of the woven fabric layer in order to thus create a form strength of the woven fabric layer. Subsequently, the woven fabric layer is reshaped into a preform layer, wherein the binder is activated during the reshaping and the woven fabric is stabilized in the reshaped shape. The preform layer is then applied to further woven fabric layers in order to strengthen the preform layer. In so doing, woven fabric layers can be individually connected to the preform layer or, however, already pre-connected woven fabric layers, so-called laid structures, can also be used. The connection of the preform layer and the further woven fabric layers thus results in a preform, which is inserted into a molding tool for carrying out an RTM process. Then, the RTM process is carried out as described above in order to obtain a fibrous composite material component.

By providing the binder and activating it during the reshaping of the provided woven fabric layer, a shaped woven fabric layer is produced, which can serve as the visible layer in the further production of a visible carbon component. Due to the activation of the binder, a blurring of the woven fabric can be effectively inhibited during the RTM process while refraining from the use of other auxiliary elements to be disposed of after the process. The thickness of the preform and thus its shape stability can be freely defined on the preform layer, depending on the amount of the additional woven fabric layers applied and adjusted to the requirements of the production or the respective component to be produced. By avoiding pre-saturated woven fabric layers in the creation of the preform, a porous woven fabric structure can also be produced, which can well connect to the resin injected in the RTM process, and is thus suitable for producing high-quality fibrous composite material components.

In an advantageous embodiment of the invention, the binder to be applied to the woven fabric layer is powdered. Thus, it can be ensured that it can be evenly distributed on the woven fabric layer without any problems. In addition, a clean working method can be ensured during production by means of a powdered binder. In addition, it is possible to simply provide the powdered binder only locally on the woven fabric layer.

The powdered binder preferably consists of thermoplastic components, in particular bisphenol A. Thermoplastic materials can be reshaped at higher temperatures and then solidify again. A reshaping of a previously formed woven fabric layer is thus possible.

Alternatively or additionally, the binder preferably comprises a reactive thermosetting binder. Thermosetting materials cannot be further deformed after a single hardening, thereby ensuring a special dimensional stability of the preform layer.

Preferably, the binder is applied in grammages of 7 $g/m^2$ to 100 $g/m^2$ depending on the requirements of the component to be produced accordingly. By varying the grammage and the type of binder, the adhesion of the preform and its stiffness or dimensional stability can be influenced.

In an advantageous embodiment of the method according to aspects of the invention, the activation of the binder is carried out by an increased pressure and/or an increased temperature. The reference air pressure is defined as normal pressure according to normal conditions of 101325 Pa. An increased pressure is thus a higher pressure than the reference air pressure under normal conditions. Analogously, the dimensional reference temperature is set to 20° C. An elevated temperature is thus considered a temperature above the dimensional reference temperature. In such an embodiment, the woven fabric layer is thus formed into a preform layer under increased pressure and/or temperature.

Embodiments are also contemplated in which the activation is carried out by other external parameters, for example by contact with a particular gas or liquid. Thus, even in such embodiments, regardless of the activation of the binder, the reshaping is preferably carried out under an increased temperature and pressure.

In an advantageous embodiment of the invention, in a further method step, the woven fabric layer to be formed as preform is cut to a desired contour. In particular, care must be taken to ensure that the cut edge of the woven fabric does not fray. This would lead to visually undesirable edges, especially in the case of visible carbon components. This step is preferably carried out before the woven fabric layer is reshaped into a preform layer. This simplifies the step of reshaping, because no unnecessary ends to be cut off from the woven fabric layer need to be handled.

In a further advantageous embodiment of the invention, for applying the preform layer to further woven fabric layers, an adhesive means is applied to the preform layer or at least one of the woven fabric layers. The adhesive means facilitates the adhesion of the woven fabric layers to one another. An adhesive or the like can be used for this purpose, for example, which reacts in particular only under certain conditions.

In an advantageous embodiment of the invention, the reshaping of the woven fabric layer occurs only locally at predefined locations. This is preferably achieved by the merely local application of binder. Alternatively or in addition, only a locally effected activation of the binder can be used. At locations without binders or without activated binders, thus no permanent shape stability is produced by the reshaping process. In this manner, preform layers can be produced that have a shape-stable reshaping at defined locations, wherein the woven fabric provided between these locations remains flexible. If such a preform layer is subsequently applied to further woven fabric layers, for example in the form of a laid structure, the flexible woven fabric also retains a shape stability depending on the choice of woven fabric layers or structure. In particular at locations of the preform layer where the end component to be produced has strong radii or deformations, a shape stability of the preform should be ensured. On the other hand, sections of the component can also be formed with as flexible woven fabric layers as possible without strong deformations (for example, sections of hoods or the like), because the risk of the woven fabric layers becoming blurred is low.

BRIEF DESCRIPTION OF THE DRAWINGS

In the following, advantageous aspects and embodiments of the invention will be explained in further detail with reference to the accompanying figure. It shows:

FIG. 1 depicts a flow chart for the sequence of the method according to aspects of the invention.

DETAILED DESCRIPTION OF THE INVENTION

The flow chart according to FIG. 1 illustrates a schematic sequence of the method according to aspects of the invention for producing a visible carbon component. First, a dry, i.e. non-saturated, woven fabric layer is provided, wherein the woven fabric is made of carbon fibers and is initially flexible. A binder is then applied to the woven fabric layer, and the woven fabric layer is reshaped.

For this purpose, the woven fabric layer is inserted into a molding tool, which presses the woven fabric layer into a mold corresponding to the end component under pressure. Further, the temperature in the molding tool is increased so that the binder is activated. By activating the binder, it remains in the corresponding mold even after removal of the preform layer now made from the woven fabric layer. The shaping by the molding tool or even only the activation of the binder can take place only locally on the woven fabric layer. Thus, for example, only regions that have a certain radius in the final shape, which make the formation of a shape-stable preform necessary, can be formed. A local activation of the binder can be achieved by a local temperature supply or a local application of the binder. The forming process, including activation of the binder, thus produces a shape-stable preform layer from a shape-flexible woven fabric layer. The preform layer is stabilized to the extent that no blurring occurs during a downstream RTM process and can thus preferably serve as the visible layer.

Due to the fact that a preform layer generally does not have the necessary thickness and stability for a component, the preform layer is subsequently applied to further woven fabric layers. Depending on the desired thickness, different numbers of woven fabric layers can be joined together. The woven fabric layers can already have been assembled in order to form a so-called laid structure or can be individually connected to the preform. They serve to support the preform layer, wherein it must be ensured that the further woven fabric layers to be applied to the preform layer are only applied from one side, so that the preform layer continues to form the visible layer of the end component. This can be referred to as "back-covering," because the preform layer is only reinforced by the woven fabric layers from the back and the front side, i.e. the side that is intended to function as the visible layer is not covered.

Due to the connection of the preform layer with the further woven fabric layers, a finished porous preform is thus created, which serves as a fibrous semi-finished product for the RTM process. The preform is thus inserted into the molding tool of the RTM process in order to create the finished component, and the RTM process is carried out. Due to the porosity of the preform, it can well connect to the resin injected during the RTM process, wherein, due to the dimensional stability of the preform layer, a blurring can be prevented. Possible aftertreatment is carried out as required, as is already known from the prior art for RTM processes.

The method according to aspects of the invention thus offers a possibility for producing a high-quality visible carbon component, wherein the disadvantages identified in the prior art are successfully eliminated.

What is claimed is:

1. A method for producing a fibrous composite material component comprising the following steps:
    applying a binder to a dry woven fabric layer,
    reshaping the dry woven fabric layer into a preform layer, wherein the binder is activated and stabilizes the woven fabric,
    following the reshaping step, applying the preform layer to further woven fabric layers using adhesive, thereby constituting a preform,
    inserting the preform into a molding tool for carrying out a resin-transfer-molding (RTM) process, and
    carrying out the RTM process such that the preform is a visible layer of the fibrous composite material component.

2. The method according to claim 1, wherein the binder to be applied to the woven fabric layer is in powder form.

3. The method according to claim 1, wherein the binder comprises thermoplastic constituents and bisphenol A.

4. The method according to claim 1, wherein the binder comprises thermosetting constituents.

5. The method according to claim 1, wherein the binder is applied in grammages from 7 $g/m^2$ to 100 $g/m^2$.

6. The method according to claim 1, wherein the reshaping of the woven fabric layer into a preform layer is carried out under increased pressure and/or increased temperature.

7. The method according to claim 1, wherein, in a further method step, the woven fabric layer is cut to a desired contour.

8. The method according to claim 1, wherein, for applying the preform layer to further woven fabric layers, an adhesive is applied to the preform layer or at least one of the woven fabric layers.

9. The method according to claim 1, wherein the reshaping of the woven fabric layer is carried out only locally.

10. The method according to claim 1, wherein the woven fabric layer comprises at least carbon fibers.

11. The method according to claim 1, wherein the reshaping of the woven fabric layer into a preform layer is carried out under increased temperature.

12. The method according to claim 1, wherein the reshaping of the woven fabric layer into a preform layer is carried out under increased pressure.

13. The method according to claim 1, wherein the binder to be applied to the woven fabric layer is in powder form, wherein the binder comprises thermoplastic constituents and bisphenol A, wherein the binder comprises thermosetting constituents, wherein the binder is applied in grammages from 7 $g/m^2$ to 100 $g/m^2$.

14. The method according to claim 1, further comprising the step of cutting the dry woven fabric prior to the reshaping step.

15. The method according to claim 1, wherein the binder is applied to only one or more portions of the dry woven fabric layer, such that the portion or portions of the dry woven fabric layer to which the binder was applied are less flexible than the portion or portions of the dry woven fabric layer to which the binder was not applied.

* * * * *